Nov. 17, 1970    B. W. LEWIS ET AL    3,540,942

PROCESS FOR APPLYING BLACK COATING TO METALS

Filed Feb. 5, 1968      2 Sheets-Sheet 1

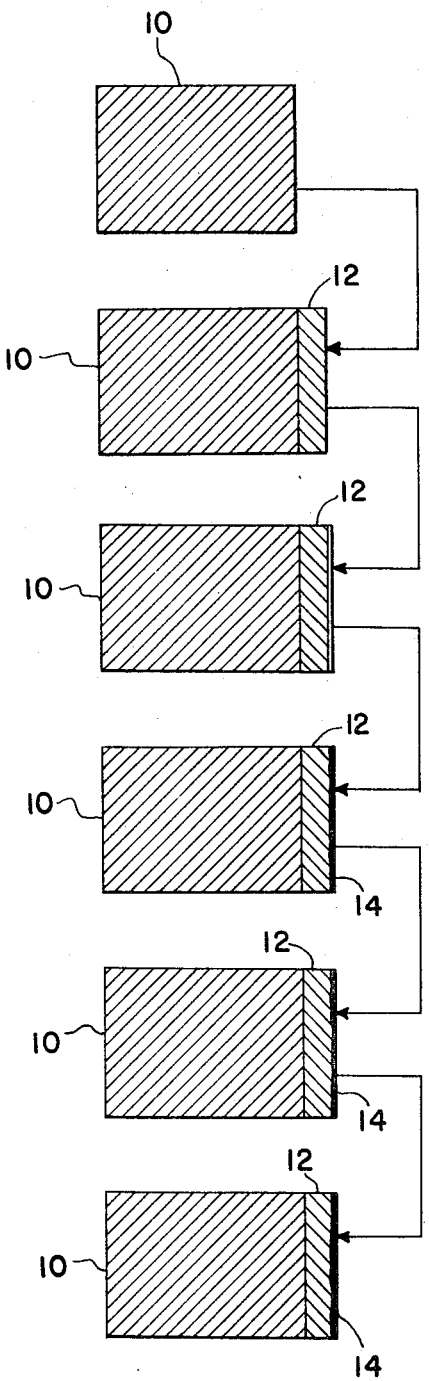

SUBSTRATE SELECTED FROM ALUMINUM, ALUMINUM ALLOYS, INCONEL AND STAINLESS STEELS.

DEPOSIT 1-6 mil LAYER CONTAINING NICKEL (PLASMA OR FLAME SPRAY).

COVER NICKEL LAYER WITH SOLUTION OF $FeCl_3$.

OXIDIZE COATING - $\approx 900°F$; 15-30 min (REACTION WITH FUSED SALT SELECTED FROM SODIUM DICHROMATE AND POTASSIUM DICHROMATE).

COOL TO ROOM TEMPERATURE AND WASH WITH COOL WATER (REPEAT OXIDIZING AND WASHING STEPS 2-4 CYCLES).

SOAK IN BOILING WATER UNTIL FREE OF SALTS ($\approx$ 10 min) AND AIR DRY.

FIG. 1

INVENTORS
BEVERLEY W. LEWIS
DONALD J. PROGAR

BY

ATTORNEYS

United States Patent Office 3,540,942
Patented Nov. 17, 1970

3,540,942
PROCESS FOR APPLYING BLACK
COATING TO METALS
Beverley W. Lewis and Donald J. Progar, Hampton, Va., assignors to the United States of America as represented by the Administrator of the National Aeronautics and Space Administration
Filed Feb. 5, 1968, Ser. No. 702,911
Int. Cl. C23f 7/02
U.S. Cl. 148—6.11                                6 Claims

ABSTRACT OF THE DISCLOSURE

This invention relates to high thermal emittance black coatings and a process for applying the same to metals and metal alloys for use in radiative cooling of spacecraft, including space power systems and the like and is capable of obtaining a measured emittance of approximately 0.96. The black coating is applied by treating a flame-sprayed nickel containing coating with a solution of metallic salts followed by reacting the surface with molten sodium or potassium dichromate.

Figure 2:
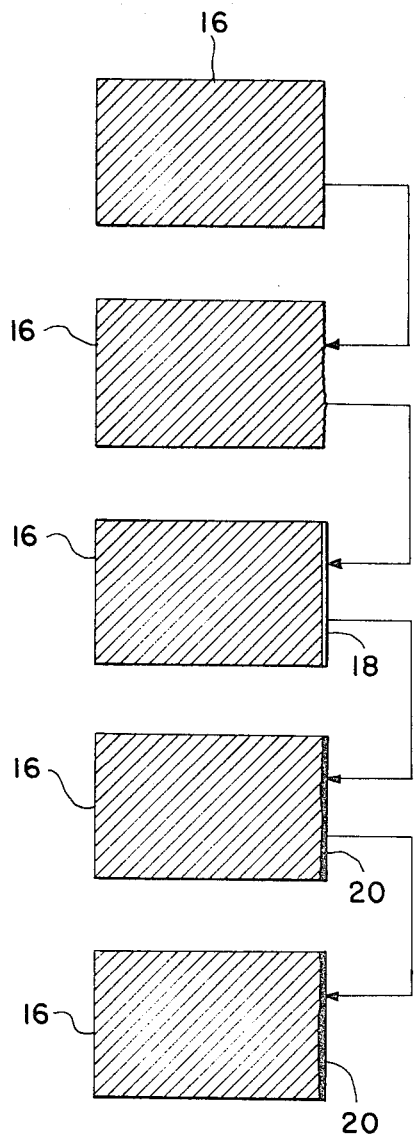

This invention was made by employees of the National Aeronautics and Space Administration and may be manufactured and used by or for the Government of the United States without the payment of any royalties thereon or therefor.

This invention relates generally to high thermal emittance surface coatings and the process for applying the same to metal and metal alloy surfaces for use in radiative cooling systems of spacecraft, space power systems and the like to serve in the thermal control systems of the vehicles when operating in a spatial environment.

Since excess heat can be dissipated from a space vehicle in space only by radiative cooling, it is necessary to use radiator surfaces with the most efficient emitting properties. The thermal emittance et (the ratio of the energy emitted by a unit surface to that radiated by a unit surface of a black body at the same temperature) is a measure of the emitting character of a surface, i.e., a black body or perfect emitter would have a thermal emittance of 1.0. Thus, radiators should have surfaces with emittances as close to 1.0 as possible.

The present invention is concerned with providing specific high thermal emittance surface areas on thin metallic surfaces for use in cooling systems for spacecraft and the like. The emittance of a coating depends on several factors such as roughness, chemical composition, and sometimes characteristics of the substrate material. Very few coatings have emittances as high as 0.96 that are stable at elevated temperatures. The total hemispherical emittance desired for use in space applications is a value very closely approaching 1.0.

Some of the best high emittance coatings currently available have emittances of only about 0.85–0.93. These known coatings are formed by processes such as plasma and flame spraying, painting, anodizing and chemical reactions where optimum thermal emittance is obtained by various procedures to produce roughness and thermal blackness. The coating of the present invention is stable at elevated temperatures and has a measured emittance of approximately 0.96. Obviously, a very few percent increase in emittance over prior art coatings gives significant improvements in efficiency in many thermal applications which can result in very important decreases in weight and size of a particular space vehicle. One major problem with all coatings is their adherence under conditions of thermal and mechanical shock or bending. Here also, various methods are employed to obtain adherent coatings, for example, flame sprayed Nichrome undercoating is used to give adherence to flame sprayed chromic oxide coatings in one prior art application. Other problems arise if the coating is to operate at elevated temperatures and in space environments which include ultrahigh vacuum, ultraviolet radiation, micrometeoroids and ionizing radiation.

Several of these known prior art coatings tend to require inorganic refractory coating materials which are stable under ultraviolet radiation conditions. Certain metal oxides are the best prospective candidates for this type of coating. Mixed oxides of nickel, chromium and iron are known to be formed on certain stainless steels when these base materials are oxidized in air at relatively high temperatures. These oxides produce, under the best conditions, black coatings of about 0.88 to 0.90 emittance values, with reasonable stabilities at high temperatures and in vacuum. Chromic oxide flame sprayed coatings have about 0.85–0.90 emittances and reasonable stability but have shown some adherency problems in prior applications. A black oxidized surface formed on a stainless steel type substrate by reaction with molten sodium dichromate ($Na_2Cr_2O_7$) has reasonably good emittance (0.90–0.95) and physical properties but has shown some instability on Inconel at temperatures above 1600° F.

Thus, indications of the prior art are that oxides of nickel, chrominum and iron produce relatively high emittance coatings with reasonable stability at elevated temperatures and in thermal space environments. Generally these known oxide coatings have been formed on alloys containing iron, nickel and chromium, as illustrated in U.S. Pat. Nos. 2,618,578 and 3,005,729. However, it is desirable to be able to make these types of coatings on lighter metals and alloys and, until the present invention, no process was known by which these coatings could be applied to aluminum and other light metals and alloys for use as structural components on space vehicles and the like.

Accordingly, it is an object of the present invention to provide a novel high thermal emittance surface coating on metallic surfaces.

Another object of the present invention is the provision of a method of applying a high thermal emittance surface coating on light metals and metal alloy surfaces for use in radiative cooling of spacecraft, space power systems, and the like.

Another object of the present invention is a novel method of applying a high thermal emittance surface coating onto an aluminum base.

A further object of the invention is a novel method of applying a high thermal emittance surface coating onto a lightweight metal or metal alloy structural surface by reacting the metal surface with a metal salt and thereafter reacting the exposed surface with a molten dichromate.

Another object of the present invention is a novel method of applying a high thermal emittance surface coating onto grit blasted roughened aluminum and aluminum alloy surfaces by reacting the surfaces with a molten dichromate.

The foregoing and other objects are attainable in one aspect of the present invention by providing a metallic base member suitable for use as the structural exterior surface of a space vehicle, space power system radiator or the like, flame or plasma spraying a thin coating layer of a metallic material from the group of nickel, Nichrome, nickel alumina cermet, nickel aluminide, and stainless steel onto said metallic base, and reacting the coated area with a molten dichromate such for example, sodium dichromate or potassium dichromate. In another embodiment of the present invention, the lightweight metallic base member surface is roughened by grit blasting and the rough surface reacted with a molten dichromate.

A more complete appreciation of this present invention and many of the attendant advantages thereof will be more readily appreciated as the same becomes better understood by reference to the following detailed description and examples when considered in connection with the accompanying drawing wherein:

FIG. 1 is a schematic flow sheet representing one process for applying high thermal emittance surface coatings onto a metallic surface, and FIG. 2 is a schematic flow sheet representing an alternate process for applying high thermal emittance surface coatings onto a metallic surface.

Referring now to FIG. 1, there is shown a metallic substrate 10 which may be selected from the group consisting of aluminum, aluminum alloys, magnesium, Inconel and stainless steel. A thin coating 12 consisting of 1–6 mils of a metallic material selected from the group consisting of nickel, nickel aluminide, Nichrome, nickel-alumina cermet, and stainless steel is then deposited onto the metal substrate 10. This coating 12 is easily applied to the substrate by plasma and flame spraying methods. Coating 12 is then covered with a solution of $FeCl_3$ and blackened to give black surface 14 by oxidizing the coated surface with a molten chromate, such for example, potassium dichromate or sodium dichromate to produce a black surface 14. In some instances the $FeCl_3$ treatment may be omitted.

Referring now to FIG. 2, an alternate method of providing high thermal alloys will now be described. In this embodiment substrate 16 which may be aluminum or any of its alloys is grit blasted to a rough finish and reacted with a strong solution of a salt selected from the group consisting of $Ni(No_3)_2$, $CoCl_2$, $Mn(No_3)_2$ and $FeCl_3$. The treated surface 18 is then dried and blackened to give a black surface 20 by treating it with a molten dichromate selected from sodium dichromate and potassium dichromate.

Specific examples for providing high thermal emittance coatings by the process illustrated in FIG. 1 appear in Examples I–IV below, while specific examples utilizing the process illustrated in FIG. 2 appear in Examples V–VIII.

EXAMPLE I

A .0625" thickness aluminum specimen was flame sprayed with a 1–6 mil thickness coating of nickel aluminide. The coated surface was covered with a solution of $FeCl_3$ and $Na_2Cr_2O_7$ crystals and placed in a furnace at about 900° F. and held for 15–30 minutes after the $Na_2Cr_2O_7$ crystals had become molten. This was removed from the furnace, cooled to room temperature and washed with cool water to remove any unreacted dichromate crystals. This treatment procedure was repeated for from two-four cycles since it had previously been determined that a single reaction period with the molten $Na_2Cr_2O_7$, regardless of the length of time, does not give the desired black coating. It was also determined that merely removing the specimen from the molten salt without washing the crystals off and exposing the surface did not produce the desired black coating. Apparently the exposure to air and/or water is necessary to a complete reaction although the reasons therefor are not understood at the present time. After the two-four cycle treatment was completed, the coated specimen was soaked in boiling water until free of dichromate, this being indicated by no water color change after a short time when placed in clear boiling water. The specimen was then air dried and was ready for testing.

EXAMPLE II–III

The same procedure as Example I except the coated specimen was (a) magnesium of .125" thickness, (b) Inconel of .0625" thickness.

EXAMPLE IV

The same procedure as in Example I except the $FeCl_3$ treatment was omitted.

EXAMPLE V

A .0625 inch thickness aluminum specimen was grit blasted (80–120 p.s.i.g. and at ≈eight inches from the surface), ultrasonically cleaned in detergent, rinsed with water and placed in a strong solution of nickel nitrate, $Ni(NO_3)_2$ for 10–20 minutes; reacted with fused sodium dichromate at approximately 900° F. for 15–30 minutes; washed with water and air dried. The nickel nitrate and subsequent steps may be repeated for optimum results.

EXAMPLE VI

A grit blasted specimen as in Example V was ultasonically cleaned in detergent, rinsed with water and placed in a solution of cobalt chloride, $CoCl_2 \cdot 6H_2O$ (5 g./100 ml. $H_2O$) for 6–15 minutes; dried; preheated and reacted with sodium dichromate at approximately 900° F. for approximately 15 minutes; washed and air dried.

EXAMPLE VII

A grit blasted specimen as in Example V was ultrasonically cleaned in detergent, rinsed with water and immersed in a strong solution of manganous nitrate $Mn(NO_3)_2 \cdot 6H_2O$ for 10 minutes; dried, preheated and placed in fused sodium dichromate at approximately 900° F. for 15 minutes, washed in water with the nitrate and dichromate treatment being repeated to complete the process.

EXAMPLE VIII

A grit blasted specimen as in Example V was ultrasonically cleaned in detergent, rinsed with water, dried and immersed in a boiling strong solution of ferric chloride $FeCl_3 \cdot 6H_2O$ for 1–10 minutes; reacted with molten sodium dichromate for 15–30 minutes at approximately 900° F., cooled to room temperature, washed with water and dried. The reaction with dichromate was repeated and the specimen washed with water and dried prior to repeating the treatment with ferric chloride and dichromate as before to complete the process.

In each of the foregoing specific examples it is to be understood that potassium dichromate may be substituted for the sodium dichromate since the properties are very similar and you would expect the same result. Also in Examples I–IV the use of the plasma spraying technique instead of the described flame spraying is also considered within the scope of the present invention.

The various substrates on which nickel aluminide can be applied are limited only by the plasma and flame spraying techniques employed. It is therefore to be understood that the specific examples described are illustrative only and are not presumed to be exhaustive since any substrate to which nickel aluminide will adhere and can withstand temperatures up to 1000° F. without excessive warpage or other detrimental effects, are considered useful and within the scope of the present invention.

Tests results, determined by X-ray diffraction, have indicated the composition of the black coating prepared by Example I above is mainly chromium oxide, however it appears that nickel, iron or some other metal is necessary to give a good black oxide coating. The measured total normal emittance of this coating on Inconel substrates ranged from 0.91 to 0.96 for a 1–15µ wavelength range in the temperature range of 900–1800° F.

The advantages of the present invention over the prior art thermal emittance coatings are believed apparent. Briefly, much higher emittance values are attainable by using the present process than in any of the prior art coating systems and the ability to apply the high emittance coatings to a variety of metals and metal alloys having metal melting points of above 1,000° F., such for example, aluminum, magnesium, Inconel, various stainless steels and the like are believed valuable contributions to the art. Although the high emittance values obtained by the present process are not completely understood it is believed that they may be partially due to the roughness of the coating, which is a result of the characteristic way the flame sprayed undercoating goes on and, in other embodiments, the roughness obtained on the substrate by the pretreating processes.

An additional advantage of the coatings of the present invention is that they are somewhat flexible and do not readily chip off due to bending of the substrate when the undercoating layer is maintained at six mils or less thickness. Surface coatings of six mils or less thickness are readily obtainable and controllable by the flame and plasma spray techniques as is readily apparent to those skilled in the art. Along these lines, the use of other flame sprayed undercoatings such as nichrome, nickel- alumina cermet, 18–8 stainless steel and pure nickel as the surface coating to be blackened are also considered within the scope of the present invention.

It is to be understood that the above-described specific coating examples are given as exemplary only that numerous modifications are readily apparent to thoese skilled in the art. For example, the specific time and temperatures mentioned in the processes are given as illustrations only and may in some instances be changed without departing from the spirit or scope of the present invention. Also the use of other substrates and the specific undercoating compositions and undercoating processes may be applied to obtain the final black oxide high emittance coating of the present invention and are considered within the teachings of the present invention.

It is therefore to be understood that within the scope of the appended claims, the invention may be practiced otherwise than as specifically described.

What is claimed as new and desired to be secured by Letters Patent of the United States is:

1. A method of providing a high thermal emittance surface on metallic surfaces for use in radiative cooling of spacecraft, space power systems, and the like, comprising the steps of:
   (1) providing a metallic base member suitable for use as components on space vehicles or the like,
   (2) flame-spraying a 1–6 mil thickness coating layer selected from the group consisting of nickel aluminide, Nichrome, nickel-alumina-cermet, 18–8 stainless steel and pure nickel onto said metallic base member,
   (3) treating the flame-sprayed coating layer by wetting it with a solution of ferric chloride, and
   (4) reacting the treated layer coating for 15–30 minutes with a molten dichromate selected from the group consisting of:
      (a) sodium dichromate, and
      (b) potassium dichromate.

2. The method of claim 1 wherein said metallic base member is selected from the group consisting of:
   (a) aluminum,
   (b) aluminum alloys,
   (c) magnesium,
   (d) Inconel, and
   (e) stainless steel alloys.

3. The method of claim 1 wherein treating and reacting of the flame-sprayed coating layer is accomplished by:
   (a) applying a solution of ferric chloride and sodium dichromate crystals to completely cover the coated base member surface,
   (b) heating the thus coated base member at approximately 900° F. to fuse said sodium dichromate crystals and maintaining this temperature for a period in the range of 15–30 minutes after fusion of said dichromate,
   (c) cooling the heated base member to room temperature and washing off any unreacted crystals of sodium dichromate with cool water,
   (d) repeating steps (a), (b) and (c) from two to four cycles,
   (e) soaking the coated base member in boiling water until free of any unreacted crystals of sodium dichromate, and
   (f) air-drying the soaked member.

4. A method of applying a high thermal emittance surface onto an aluminum base comprising the steps of:
   (1) providing an aluminum base member,
   (2) pretreating the surface of said aluminum base member by grit-blasting the aluminum surface,
   (3) treating said grit-blasted surface with a boiling water solution of metallic salts for 6–20 minutes, said metallic salts being selected from the group consisting of:
      (a) $Ni(NO_3)_2$
      (b) $CoCl_2$
      (c) $Mn(NO_3)_2$
      (d) $F_3Cl_3$
   (4) air-drying the treated surface,
   (5) reacting said surface layer with a molten salt selected from the group consisting of sodium dichromate and potassium dichromate at approximately 900° F. for 15–30 minutes,
   (6) rinsing any unreacted salt from said surface with water,
   (7) repeating steps (3)–(6) for two-four cycles, and
   (8) air-drying the resulting structure.

5. A method of providing a black oxide high thermal emittance surface on metallic surfaces comprising the steps of:
   (1) providing a metallic base member,
   (2) flame-spraying a 1–6 mil thickness layer of nickel aluminide onto the surface of said base member,
   (3) blackening the treated surface by reacting it with a molten dichromate solution selected from the group consisting of:
      (a) sodium dichromate, and
      (b) potassium dichromate.

6. The method of claim 5 wherein said metallic base member is selected from the group consisting of:
   (a) aluminum,
   (b) magnesium,
   (c) Inconel, and
   (d) stainless steel.

References Cited
UNITED STATES PATENTS

| | | | |
|---|---|---|---|
| 1,840,562 | 1/1932 | Bridges | 148—6.11 |
| 1,937,629 | 12/1933 | Carveth | 148—6.11 |
| 2,394,899 | 2/1946 | Clingan | 148—6.11 |
| 2,618,578 | 11/1952 | Kreml | 148—6.11 X |

RALPH S. KENDALL, Primary Examiner

U.S. Cl. X.R.

117—105, 105.2; 244—1